United States Patent
Kim et al.

(10) Patent No.: US 9,434,438 B1
(45) Date of Patent: Sep. 6, 2016

(54) METHOD FOR DRIVING TWO-WHEEL SELF-BALANCING SCOOTER TO MAINTAIN STRAIGHT DRIVABILITY AT OCCURRENCE OF EXTERNAL FORCE

(71) Applicant: ROBO3 Co., Ltd., Seoul (KR)

(72) Inventors: Joon-Hyung Kim, Seoul (KR); Hwa Sung Jun, Seoul (KR)

(73) Assignee: ROBO3 CO., LTD., Nonhyeon-Ro, Gangnam-Gu, Seoul (KR)

( * ) Notice: Subject to any disclaimer, the term of this patent is extended or adjusted under 35 U.S.C. 154(b) by 0 days.

(21) Appl. No.: 14/846,617

(22) Filed: Sep. 4, 2015

(30) Foreign Application Priority Data

Aug. 5, 2015 (KR) ........................ 10-2015-0110432

(51) Int. Cl.
*B60L 9/00* (2006.01)
*B62K 3/00* (2006.01)

(52) U.S. Cl.
CPC ..................................... *B62K 3/007* (2013.01)

(58) Field of Classification Search
CPC ...... B62D 61/04; B62D 61/02; B62D 61/12; B62H 1/12; B62K 11/00; B62K 11/10
See application file for complete search history.

(56) References Cited

U.S. PATENT DOCUMENTS

| 4,579,188 | A | * | 4/1986 | Facer | B62M 13/04 180/211 |
| 5,257,671 | A | * | 11/1993 | Watkins | B62D 61/02 180/209 |
| 5,628,379 | A | * | 5/1997 | Watkins | B62D 61/02 180/209 |
| 5,816,354 | A | * | 10/1998 | Watkins | B62D 61/02 180/209 |
| 5,904,218 | A | * | 5/1999 | Watkins | B62D 61/02 180/209 |
| 6,006,849 | A | * | 12/1999 | Watkins | B62H 1/12 180/209 |
| 2008/0246334 | A1 | * | 10/2008 | Drescher | B60T 8/3225 303/11 |
| 2011/0057411 | A1 | * | 3/2011 | Scolari | B62K 3/002 280/221 |

* cited by examiner

*Primary Examiner* — Redhwan k Mawari
(74) *Attorney, Agent, or Firm* — John K. Park; Park Law Firm

(57) ABSTRACT

Disclosed is a method for driving a two-wheel self-balancing scooter to maintain straight drivability at occurrence of external force. The method includes a driving ready step of applying a power to the two-wheel self-balancing scooter (S10), a driving step of setting a driving speed and a forward/backward direction by leaning an occupant's body forward or backward (S20), when one wheel goes flat, a revolutions increasing step of rapidly increasing revolutions of the flat wheel (S30), a revolutions decreasing step of decreasing revolutions of a normal wheel according to the revolutions of the flat wheel (S40), a revolutions synchronizing step of equally setting the revolutions of the flat wheel and the normal wheel (S50), and a synchronization repeating step of repeating the revolutions synchronizing step (S60).

1 Claim, 8 Drawing Sheets

(a)

(b)

METHOD FOR DRIVING TWO-WHEEL SELF-BALANCING SCOOTER TO MAINTAIN STRAIGHT DRIVABILITY AT OCCURRENCE OF EXTERNAL FORCE

BACKGROUND OF THE INVENTION

1. Field of the Invention

The present invention relates to a method for driving a two-wheel self-balancing scooter by reading alterations in center of gravity of an occupant in real time, and more specifically, to a method for driving a two-wheel self-balancing scooter that includes each wheel located at left and right sides on the basis of an occupant, in which when one wheel goes flat by any external force during driving, the scooter does not lean aside, but can safely drive straight.

2. Background of the Related Art

A two-wheel self-balancing scooter includes two wheels, that is, one wheel being located at a right side of an occupant, and the other wheel being located at a left side of the occupant. The self-balancing scooter is an electrically powered machine capable of being electrically driven, without losing the balance, by reading alternations in center of gravity in real time.

According to a method for driving the self-balancing scooter, for example, if the occupant leans his or her body forward or backward at a desired angle in a state in which the occupant gets on the scooter, the center of gravity of the occupant is read and converted into a slope in real time by various sensors, such as a gyroscope, provided in the scooter. When the occupant leans the center of gravity forward or backward, the wheels are driven in a direction of the slope in proportion to the slope, so that the self-balancing scooter does not fall due to the slope.

Accordingly, the center of gravity of the occupant is compensated to a correct position by rotating the wheels in response to the slope, and thus the scooter can drive while maintaining in an upright state, without losing the balance, even though the scooter is equipped with the pair of wheels at the right and left sides on the basis of the occupant.

However, the two-wheel self-balancing scooter has a problem in that since the configuration of the scooter includes each wheel arranged in series at the right and left sides on the basis of the occupant, when one wheel goes flat, the self-balancing scooter leans toward the flat wheel. As a result, the self-balancing scooter loses the balance and then falls down, which causes damage to the scooter itself, and also serious damage to the occupant.

SUMMARY OF THE INVENTION

Therefore, the present invention has been made in view of the above problems, and an object of the present invention is to provide a method for driving a two-wheel self-balancing scooter capable of safely driving straight, even in a dangerous accident, for example, when one tire goes flat during driving, without leaning toward the flat tire.

According to one aspect of the present invention, there is provided a method for driving a two-wheel self-balancing scooter to maintain straight drivability at occurrence of external force, including: a driving ready step of applying a power to the two-wheel self-balancing scooter; a driving step of setting a driving speed and a forward/backward direction by leaning an occupant's body forward or backward; when one wheel goes flat, a revolutions increasing step of rapidly increasing revolutions of the flat wheel; a revolutions decreasing step of decreasing revolutions of a normal wheel according to the revolutions of the flat wheel; a revolutions synchronizing step of equally setting the revolutions of the flat wheel and the normal wheel; and a synchronization repeating step of repeating the revolutions synchronizing step.

With the above configuration, if the two-wheel self-balancing scooter is operated by the method for driving the scooter to maintain the straight drivability at occurrence of the external force, even though the first wheel goes flat due to the poor road surface or the defect of the wheel itself, the revolutions of the first flat wheel is set to be deferent from those of the second normal wheel, and thus an imaginary axis aligning line connecting the first wheel and the second wheel in line becomes perpendicular to an imaginary straight driving line which is set immediately before the accident, thereby maintaining the straight drivability of the two-wheel self-balancing scooter. Therefore, the unstable driving phenomenon of the two-wheel self-balancing scooter. As a result, it is possible to solve the overturn problem of the two-wheel self-balancing scooter which is caused by the unstable driving phenomenon, and to provide an effect of preventing the occupant from being seriously damaged in advance.

DESCRIPTION OF SYMBOLS

Figure 1:
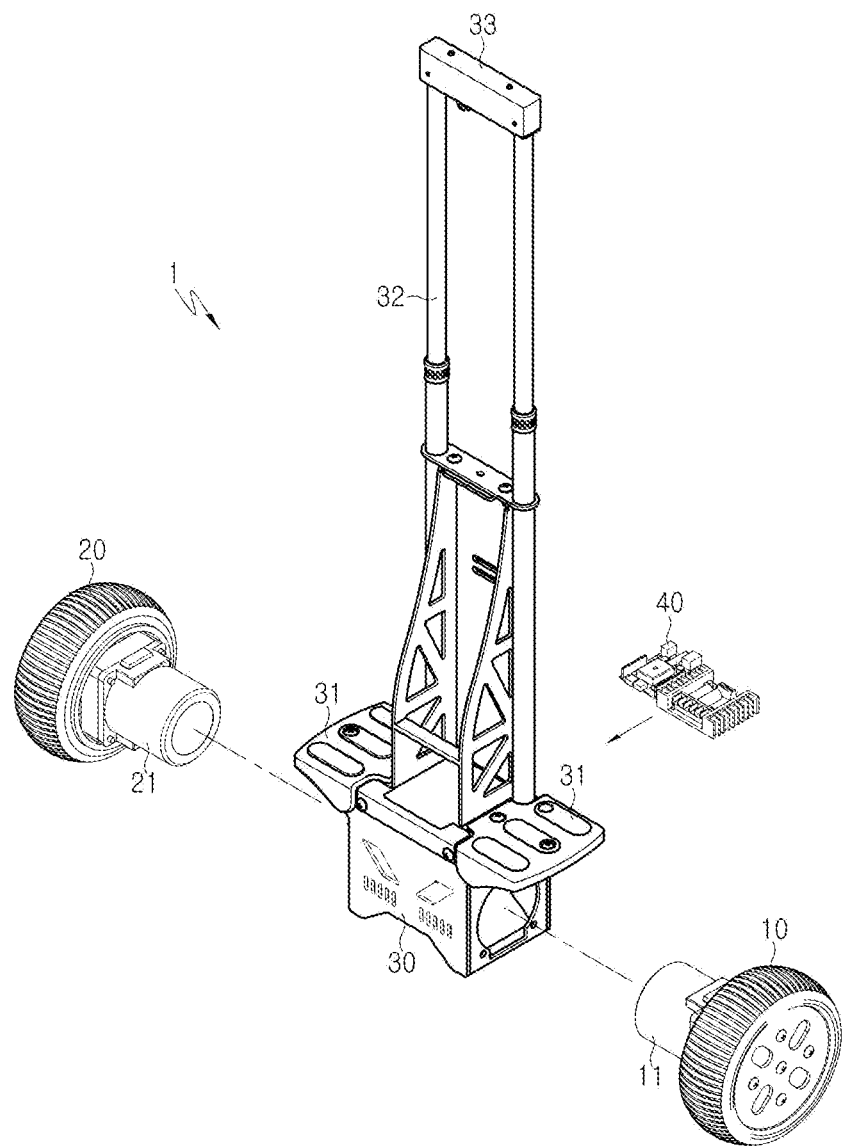
FIG. 1 is an exploded perspective view illustrating the configuration of a standing self-balancing scooter.

1: Standing self-balancing scooter
2: Self-balancing wheelchair
10: First wheel
11: First motor
20: Second wheel
21: Second motor
30: Wheel housing
31: Footplate
32: Vertical frame
33: Handle
40: Controller
50: Seat
A, A': Axis aligning line
C: Sharp curve driving line
S: Straight driving line
R: Restoring driving line
S10: Driving ready step of applying power S20: Driving step of setting driving speed and forward/backward direction by leaning body forward or backward S30: Revolutions increasing step of rapidly increasing revolutions of flat wheel when one wheel goes flat S40: Revolutions decreasing step of decreasing revolutions of normal wheel according to revolutions of flat wheel S50: Revolutions synchronizing step of equally setting revolutions of flat wheel and normal wheel S60: Synchronization repeating step of repeating revolutions synchronizing step

DETAILED DESCRIPTION OF THE PREFERRED EMBODIMENT

A two-wheel self-balancing scooter according to an aspect of the present invention is an electrically powered machine of a self-balancing type that includes each wheel located at right and left sides on the basis of an occupant, and that can be driven stably by reading alternations in center of gravity in real time.

The two-wheel self-balancing scooter according to the present invention is controlled by a controller 40 having various electrical processors, as well as a gyroscope, that measures the center of gravity of the occupant and converts it into a slope, thereby keeping a balance between the rotating wheels.

Now, the method for driving the two-wheel self-balancing scooter to maintain straight drivability according to the present invention will be described in detail with reference to the accompanying drawings, and the configuration or functions thereof known to the art will be not described herein for clarity.

FIG. 1 is an exploded perspective view illustrating the configuration of the standing self-balancing scooter according to the present invention. As illustrated in FIG. 1, the standing self-balancing scooter includes a wheel housing 30, a first wheel 10 connected to a first motor 11 at a right side of the wheel housing 30, a second wheel 20 connected to a second motor 21 at a left side of the wheel housing 30, a footplate 31 mounted to a top surface of the wheel housing 30 on which an occupant stands, a vertical frame 32 vertically installed on the footplate 31, a handle 33 mounted to an upper portion of the vertical plate 31, and a controller built in the wheel housing 30.

The controller 40 is a control system equipped with various electrical processors including a gyroscope, in order to measure a center of gravity of the occupant who stands on the footplate 31. For example, if the occupant leans his or her body forward at a desired angle in a state in which the occupant gets on the standing self-balancing scooter 1, various sensors including the gyroscope mounted on the controller 40 read a slope in real time, and the wheels are driven in a direction of the slope in proportion to the slope, in order to prevent the standing self-balancing scooter 1 from falling due to the slope. Therefore, the posture of the standing self-balancing scooter 1 is corrected to stand upright, so that the scooter drives in a stable posture.

Figure 2:
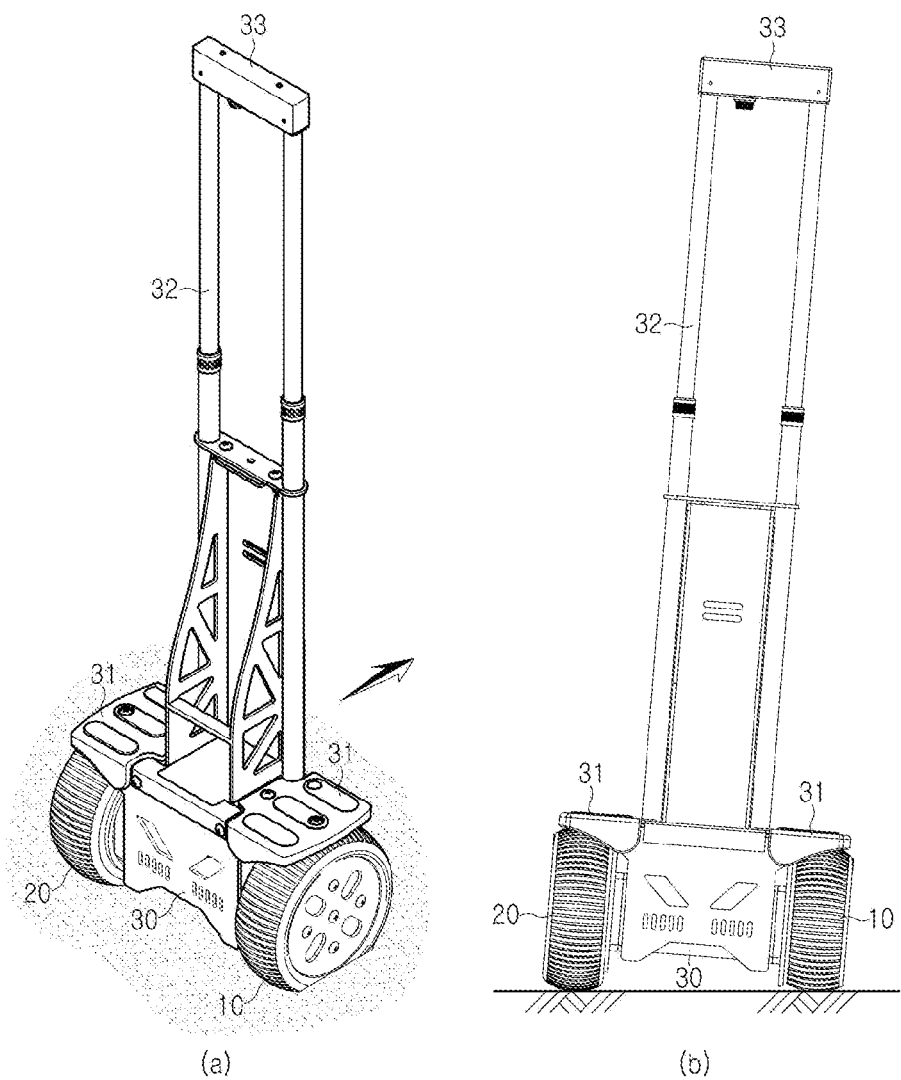
FIG. 2 are perspective and front views illustrating the standing self-balancing scooter with a flat tire.
Figure 3:
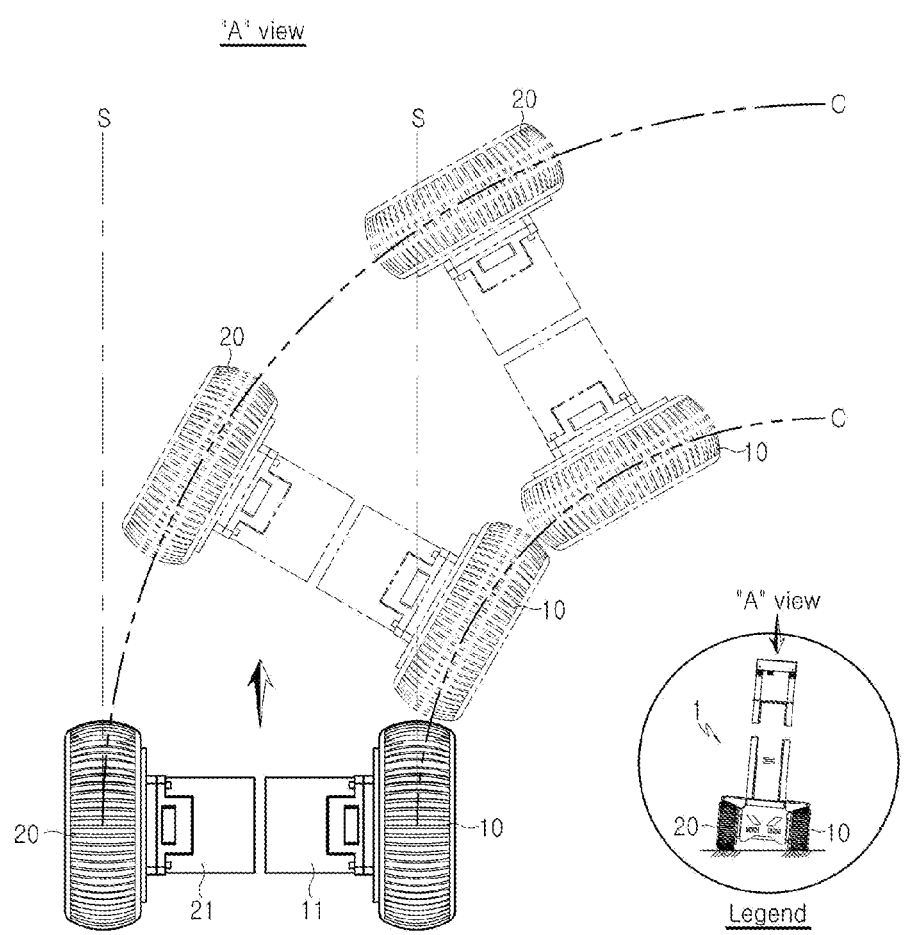
FIG. 3 is a plan view illustrating an unbalanced driving risk of the standing self-balancing scooter with the flat tire.

However, the standing self-balancing scooter 1 which travels in the stable posture has the following problems during driving. The problems will be described with reference to FIGS. 2 and 3. FIG. 2 are perspective and front views illustrating the standing self-balancing scooter with a flat tire. FIG. 3 is a plan view illustrating an unbalanced driving risk of the standing self-balancing scooter with the flat tire.

FIG. 2A is a perspective view of the standing self-balancing scooter 1, and FIG. 2B is a front view of the standing self-balancing scooter 1. FIG. 2 shows the first flat tire 10 in which the wheel of the standing self-balancing scooter 1 goes flat due to a poor road surface or a defect of the wheel itself.

If the first wheel 10 goes flat while the standing self-balancing scooter 1 including the first wheel 10 and the second wheel 20 mounted to both sides on the basis of the standing occupant is driving, the standing self-balancing scooter 1 losses the balance and then falls down, which causes damage to the scooter itself, and also serious damage to the occupant. Therefore, the standing self-balancing scooter 1 should continuously drive in the standing state, in spite of any external force, as well as the flat tire.

As illustrated in FIG. 3, however, the standing self-balancing scooter 1 stably drives along the imaginary straight driving line S which is indicated by the one-dot chain line, before the external force, like a flat tire, is applied to the wheel. If the first wheel 10 goes flat, the standing self-balancing scooter 1 suddenly drives in curve about the first flat wheel 10, and thus drives along an imaginary sharp curve line C, which is indicated by the two-dot chain line, in a state of leaning aside. In this instance, the standing self-balancing scooter 1 and the occupant lose the balance and then fall down, which causes damage to the scooter itself, and also serious damage to the occupant. Since this damage is increased in proportion to its driving speed, the scooter and the occupant may be further damaged at high speed.

Figure 4:
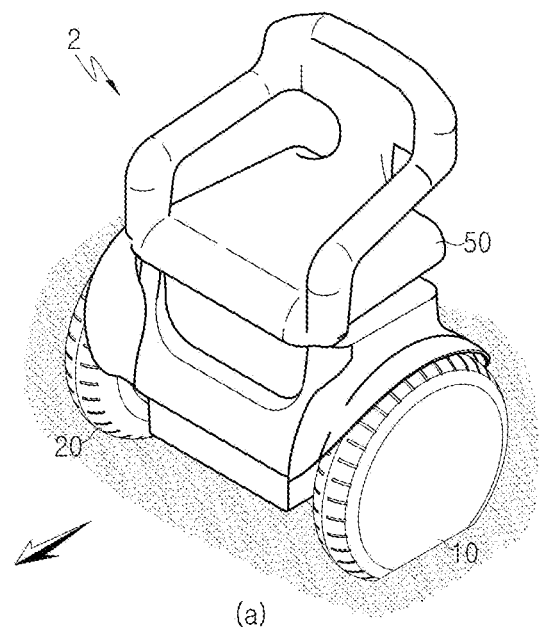
FIG. 4 are perspective and front views illustrating a self-balancing wheelchair with a flat tire.
Figure 4:
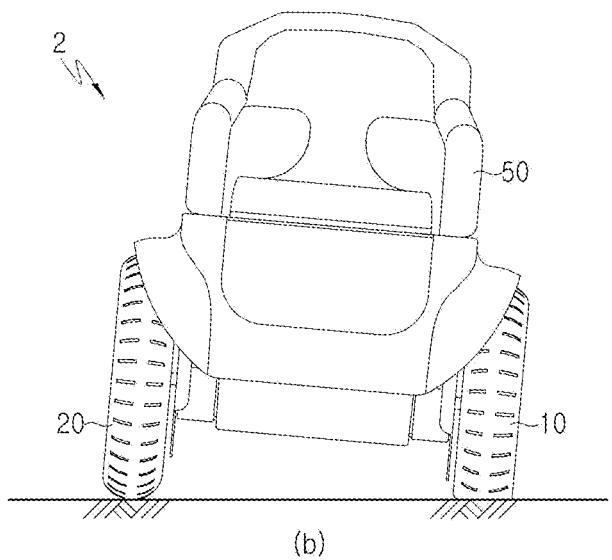
Figure 5:
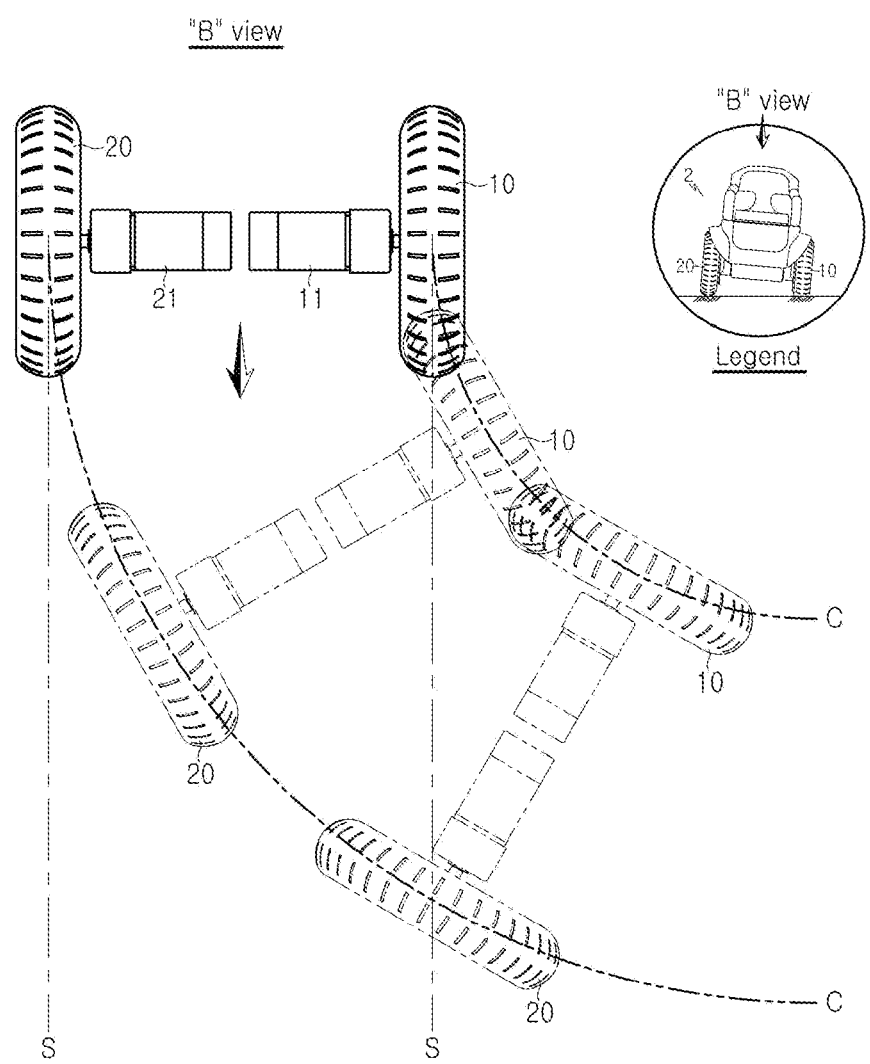
FIG. 5 is a plan view illustrating an unbalanced driving risk of the self-balancing wheelchair with the flat tire.

FIG. 4 are perspective and front views illustrating a self-balancing wheelchair 2 with a flat tire. FIG. 5 is a plan view illustrating an unbalanced driving risk of the self-balancing wheelchair with the flat tire. The self-balancing wheelchair 2 shown in FIGS. 4 and 5 is applied by the two-wheel self-balancing technology, and is developed to provide convenient mobility to people for whom walking is difficult or impossible due to illness, injury or disability.

Recently, powered wheelchairs with four wheels are supplied to the disabled and the elderly, due to the inconvenient mobility of manually propelled wheelchairs. However, the powered wheelchair with the four wheels has problems in that it cannot quickly rotate, and is hard to drive on a stepped road surface, in view of its configuration of the four wheels.

In comparison to the powered wheelchair with the four wheels, the two-wheel self-balancing wheelchair 2 has advantages in that since first and second large wheels 10 and 20 are installed to both sides of the wheelchair 2 on the basis of a seat 50, it can quickly rotate at driving, and is easy to drive on the stepped road surface.

If the first wheel 10 goes flat by any external force while the self-balancing wheelchair 2 is driving, it can cause a big damage of human life, since the occupant is the disable or the elderly.

Specifically, FIG. 4A is a perspective view of the self-balancing wheelchair 2, and FIG. 4B is a front view of the self-balancing wheelchair 2. FIG. 4 shows the first flat tire 10 in which the first wheel 10 of the self-balancing wheelchair 2 used by the disable or the elderly for whom walking is difficult or impossible goes flat due to a poor road surface or a defect of the wheel itself.

As illustrated in FIG. 4, if any external force is applied to the first wheel 10 mounted to one side on the basis of the occupant seating on the self-balancing wheelchair 2 goes flat, the self-balancing wheelchair 2 loses the balance and then falls down, which causes damage to the wheelchair itself, and also serious damage to the occupant. Therefore, the self-balancing wheelchair 2 should continuously drive straight, in spite of any external force, as well as the flat tire.

As illustrated in FIG. 5, however, the self-balancing wheelchair 2 stably drives along an imaginary straight driving line S which is indicated by a one-dot chain line, before the external force, like a flat tire, is applied to the wheel. If the first wheel 10 goes flat, the self-balancing wheelchair 2 suddenly drives in curve about the first flat wheel 10, and thus drives along an imaginary sharp curve line C, which is indicated by a two-dot chain line, in a state of leaning aside. In this instance, the self-balancing wheelchair 2 and the occupant lose the balance and then fall down, which causes damage to the wheelchair itself, and also serious damage to the occupant who is the disabled or the elderly.

The reason why the scooter and the wheelchair drive in the state of leaning toward the flat wheel is that the number of revolutions of both wheel axles is controlled by an encoder. That is, the encoder detects the revolutions of both wheel axles, and maintains the revolutions equally to drive straight. Although the outer diameter of the flat wheel is smaller than that of the normal wheel, the encoder maintains the revolutions of both wheel axles, and thus the scooter or the wheelchair drives in the state of leaning toward the flat wheel, thereby causing an overturn accident.

The leaning problem of the standing self-balancing scooter 1 and the self-balancing wheelchair 2 which is caused by the flat wheel at driving has been described above. In spite of various advantages of the two-wheel self-balancing scooter, it does not become popular, due to the above-described problem in that the scooter drives in the state of leaning aside by any external force, like the flat tire.

The present invention can effectively solve the above-described problems existing in the art by providing a method for driving the two-wheel self-balancing scooter, in which when one wheel goes flat by any external force during driving, the scooter can drive straight.

Figure 6:
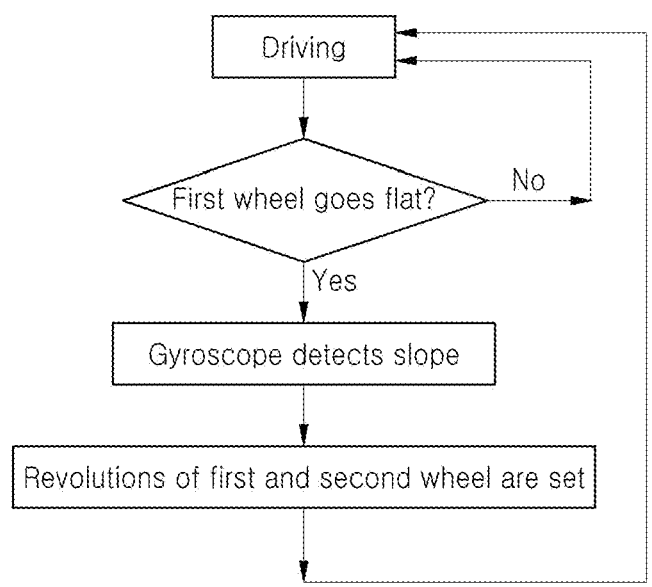
FIG. 6 is a flow chart illustrating a function of a gyroscope according to the present invention.

FIG. 6 is a flow chart illustrating a function of a gyroscope according to the present invention. The basic concept that the two-wheel self-balancing scooter drives straight in spite of any external force will be described with reference to FIG. 6. As illustrated in FIG. 6, if the first wheel 10 of the driving self-balancing scooter goes flat, the gyroscope mounted on a controller 40 recognizes the suddenly occurring flat state as a state in which an imaginary axis aligning line A connecting the first wheel 10 and the second wheel 20 in line is offset from a perpendicular relation between the axis aligning line A and a straight driving line B, in which the axis aligning line A is normally perpendicular to the straight driving line B.

When the gyroscope detects the offset state, the revolutions of the first and second wheels 10 and 20 are differently set by quickly increasing the revolutions of the first flat wheel 10 and decreasing the revolutions of the second normal wheel 20, so that the axis aligning line A is maintained to be perpendicular to the straight driving line S which is set immediately before the wheel goes flat. As a result, the two-wheel self-balancing scooter can drive straight in spite of any external force, like the flat tire.

Figure 7:
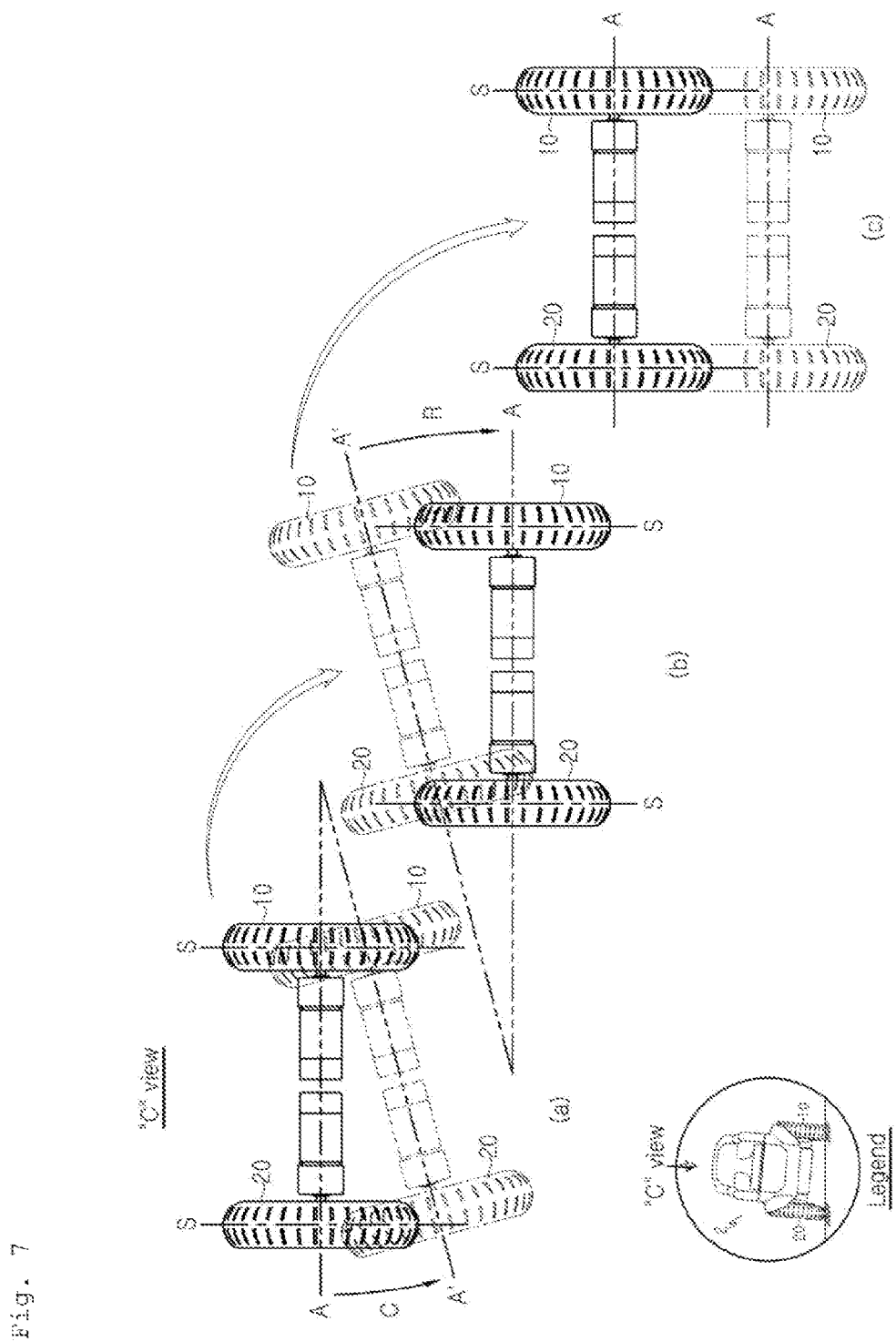
FIG. 7 is a flow chart illustrating steps of maintaining straight drivability when any external force is applied to a two-wheel self-balancing scooter, according to the present invention.
Figure 8:
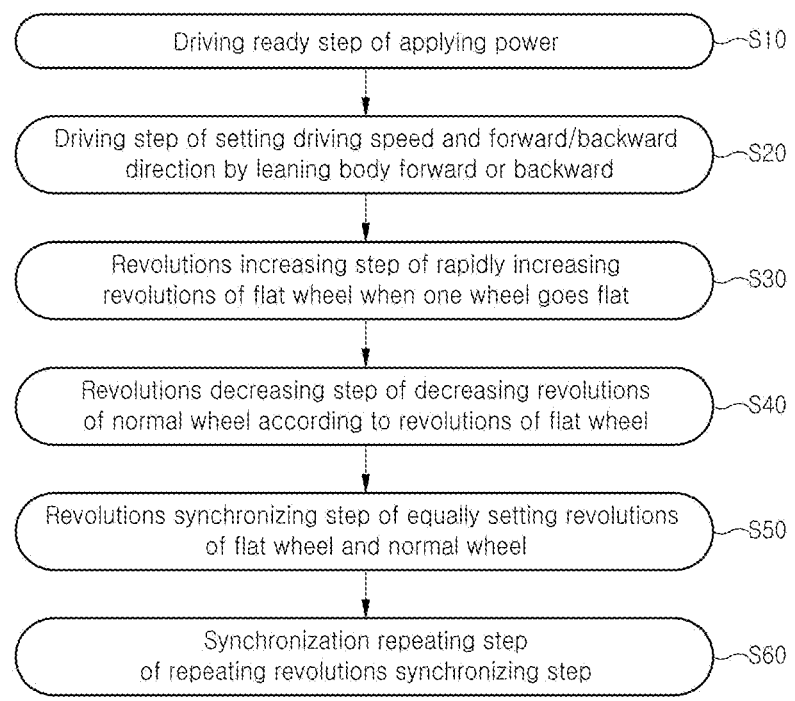
FIG. 8 is a flow chart illustrating a method for driving the two-wheel self-balancing scooter to maintain the straight drivability at occurrence of any external force, according to the present invention.

FIG. 7 is a plan view of the self-balancing wheelchair 2 in FIGS. 4 and 5 when seen from a top, as illustrated by a circular legend. Specifically, FIG. 7 is a flow chart illustrating steps of maintaining the straight drivability of the two-wheel self-balancing scooter according to the present invention when any external force, like the flat tire, occurs. FIG. 8 is a flow chart illustrating a method for maintaining the straight drivability at occurrence of any external force, like the flat wheel while the two-wheel self-balancing scooter 1 or the two-wheel self-balancing wheelchair 2 is driving. The method for driving the two-wheel self-balancing scooter to maintain the straight drivability at occurrence of any external force will be described in detail with reference to FIGS. 7 and 8.

In FIG. 7A, the first wheel 10 and the second wheel 20 which are indicated by a solid line are aligned in line with the imaginary axis aligning line A which is indicated by the bold two-dot chain line. In this state, the occupant is ready to drive by turning on a power (S10; driving ready step of applying power).

If the occupant leans his or her body forward or backward at the driving ready step (S10), the gyroscope or the like mounted on the two-wheel self-balancing scooter operates, and the controller 40 detects the center of gravity of the occupant relative to a slope in real time. The first wheel 10 and the second wheel 20 are set to a desired driving speed and a desired forward/backward direction according to the slope, and thus the scooter drives straight in a stable state along the straight driving line S which is indicated by the bold one-dot chain line in FIG. 7A (S20; driving step of setting driving speed and forward/backward direction by leaning body forward or backward).

As indicated by the fine two-dot chain line in FIG. 7A, the first wheel 10 of the driving two-wheel self-balancing scooter goes flat, the second wheel 20 suddenly drives in curve about the first flat wheel 10, and thus the scooter drives along the imaginary sharp curve line C, which is indicated by the arrow in FIG. 7A, in a state of leaning aside.

In this instance, the present invention prevents the problem in that the two-wheel self-balancing scooter loses the balance and then falls down, which causes damage to the scooter itself, and also serious damage to the occupant.

As illustrated in FIG. 7B, if the number of revolutions of the first flat wheel 10 is abruptly increased, the first flat wheel 10 drives along a restoring driving line R about the second wheel 20 in the state of leaning aside, as indicated by the arrow in FIG. 7B. As a result, the offset axis aligning line A' indicated in FIG. 7B becomes perpendicular to the imaginary straight driving line S, thereby maintaining the straight drivability which is set at the initial driving step (S30; revolutions increasing step of rapidly increasing revolutions of flat wheel when one wheel goes flat).

Following up the revolutions increasing step (S30), the number of revolutions of the second wheel normally operating is decreased according to the revolutions of the first flat wheel 10. As a result, as illustrated in FIG. 7B, the offset axis aligning line A' becomes perpendicular to the imaginary straight driving line S, thereby maintaining the straight drivability which is set at the initial driving step (S40; revolutions decreasing step of decreasing revolutions of normal wheel according to revolutions of flat wheel).

As illustrated in FIG. 7C, the revolutions of the first flat wheel 10 are equal to those of the second normal wheel 20 through the revolutions increasing step (S30) and the revolutions decreasing step (S40), the imaginary axis aligning line A connecting the first wheel 10 and the second wheel 20 in line becomes perpendicular to the imaginary straight driving line S, so that the two-wheel self-balancing scooter restores the straight drivability (S50; revolutions synchronizing step of equally setting revolutions of flat wheel and normal wheel).

After the revolutions synchronizing step S50), as illustrated in FIG. 7C, the imaginary axis aligning line A becomes continuously perpendicular to the imaginary straight driving line S, by repeating the step of equally setting the revolutions of the flat wheel 10 and the revolutions of the second normal wheel 20, so that the two-wheel self-balancing scooter maintains the straight drivability in spite of any external force (S60; synchronization repeating step of repeating revolutions synchronizing step).

As described above, if the two-wheel self-balancing scooter is operated by the method for driving the scooter to maintain the straight drivability at occurrence of the external force, even though the first wheel 10 goes flat due to the poor road surface or the defect of the wheel itself, the revolutions of the first flat wheel is set to be deferent from those of the second normal wheel, and thus the imaginary axis aligning line A connecting the first wheel 10 and the second wheel 20 in line becomes perpendicular to the imaginary straight driving line S which is set immediately before the accident, thereby maintaining the straight drivability of the two-wheel self-balancing scooter. Therefore, the unstable driving phenomenon of the two-wheel self-balancing scooter. As a result, it is possible to solve the overturn problem of the two-wheel self-balancing scooter which is caused by the unstable driving phenomenon, and to provide an effect of preventing the occupant from being seriously damaged in advance.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for driving a two-wheel self-balancing scooter to maintain straight drivability at occurrence of external force, comprising:
    a driving ready step of applying a power to the two-wheel self-balancing scooter;
    a driving step of setting a driving speed and a forward/backward direction by leaning an occupant's body forward or backward;
    when one wheel goes flat, a revolutions increasing step of rapidly increasing revolutions of the flat wheel;
    a revolutions decreasing step of decreasing revolutions of a normal wheel according to the revolutions of the flat wheel;
    a revolutions synchronizing step of equally setting the revolutions of the flat wheel and the normal wheel; and
    a synchronization repeating step of repeating the revolutions synchronizing step.

* * * * *